(12) United States Patent
Nieschulze

(10) Patent No.: US 6,659,859 B2
(45) Date of Patent: Dec. 9, 2003

(54) SHIELD FOR PREVENTING THE ACCUMULATION OF CROP PARTICLES ON DRIVE COMPONENT HOUSINGS OF A SELF-PROPELLED FORAGE HARVESTER

(75) Inventor: Henrik Nieschulze, Wieren (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/004,620

(22) Filed: Dec. 5, 2001

(65) Prior Publication Data

US 2002/0073670 A1 Jun. 20, 2002

(30) Foreign Application Priority Data

Dec. 20, 2000 (DE) .......................................... 100 63 555

(51) Int. Cl.[7] ................................................ A01F 12/54
(52) U.S. Cl. ...................................................... 460/117
(58) Field of Search ................................ 56/13.3, 13.4, 56/13.5, 13.6; 460/16, 17, 18, 19, 20, 117, 901, 97, 98, 99, 100, 101, 102; 296/190.01; 180/89.12, 84; 280/847, 848

(56) References Cited

U.S. PATENT DOCUMENTS

| 2,834,633 | A | * | 5/1958 | Ashton .................. 296/190.08 |
| 3,187,491 | A | * | 6/1965 | Karlsson ..................... 56/13.3 |
| 3,333,888 | A | * | 8/1967 | Williams et al. ............ 296/102 |
| 3,705,483 | A | * | 12/1972 | Jarrell et al. ................. 56/13.5 |
| 4,385,484 | A | * | 5/1983 | Ehrhart et al. ............. 56/320.1 |
| 4,433,868 | A | * | 2/1984 | Hochwitz et al. ............. 296/79 |
| 5,322,472 | A | * | 6/1994 | Little ......................... 460/117 |
| 5,863,005 | A | | 1/1999 | Bramstedt et al. |

* cited by examiner

Primary Examiner—Árpád Fábián Kovács

(57) ABSTRACT

A self-propelled forage harvester is equipped with a crop gathering device which transports crop material from the ground to feed rolls that position the crop for being chopped into small pieces by a chopper drum. To prevent pieces of crop material from accumulating on top of the housing structure for the feed rolls and the chopper drum, a flexible shield is mounted between the bottom of the operator's cab and the top of the crop gathering device. Various different access elements of the shield may be quickly opened to provide access to the feed rolls, chopper drum and other functioning elements provided for processing the crop.

10 Claims, 3 Drawing Sheets

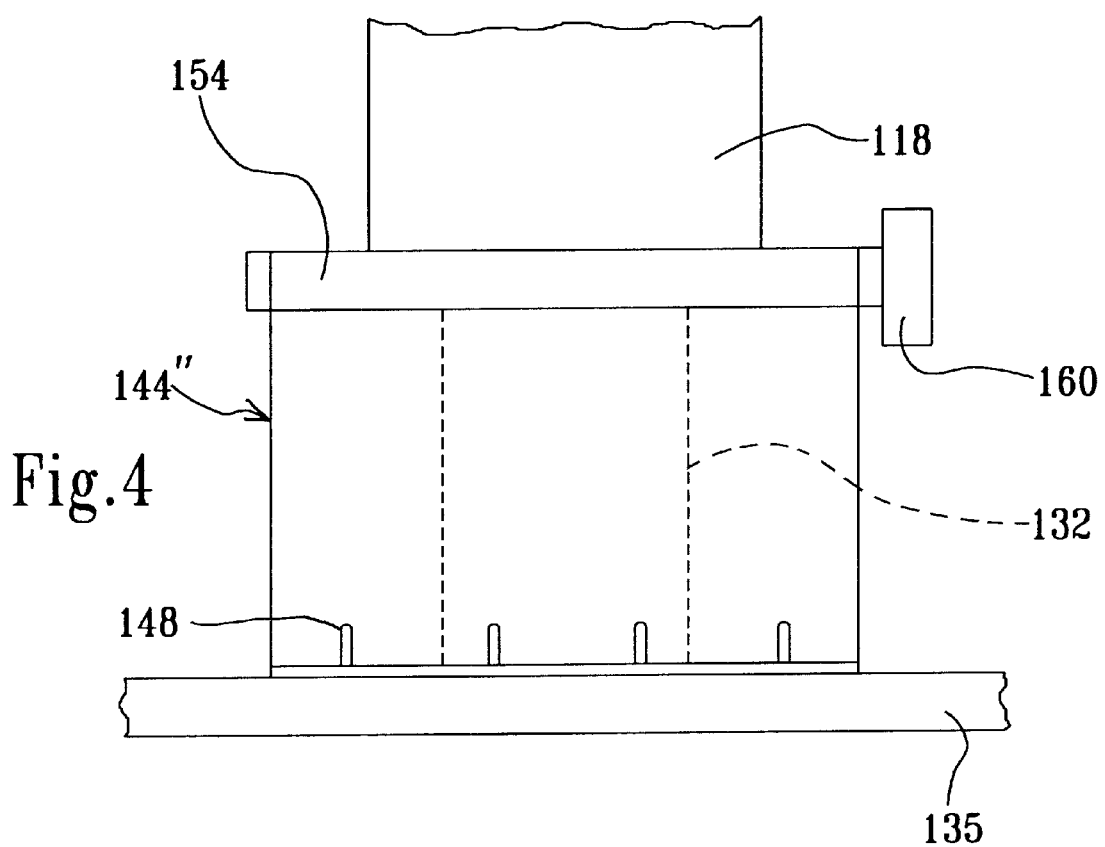

SHIELD FOR PREVENTING THE ACCUMULATION OF CROP PARTICLES ON DRIVE COMPONENT HOUSINGS OF A SELF-PROPELLED FORAGE HARVESTER

FIELD OF THE INVENTION

The invention pertains to devices for controlling the accumulation of crop particles on a harvesting vehicle.

BACKGROUND OF THE INVENTION

In the prior art, a few pick-ups are equipped with so-called contaminant collecting screens. They retain the majority of crop particles deposited on the screw conveyor by the feed fingers or feed paddles. However, some crop particles are still deposited on the subsequent subassemblies of the chopper, e.g., airborne grass. Another disadvantage of the crop particle collecting screens can be seen in the fact that the view of the swath is significantly impaired during pick-up. It is also very difficult to protect corn attachments from light and small crop particles.

During harvest operations, crop particles are often deposited on the top of subsequent subassemblies through which the harvest is transported into the harvester or in which the harvest is processed, and accumulate at these locations. A fire may break out, for example, due to an overheated bearing or when performing a sharpening or grinding operation on the blades of the chopping drum. Consequently, the harvester needs to be cleaned frequently. Much time is lost in cleaning the machine, in particular when performing repair and maintenance procedures (e.g., during the quick-conversion of a kernel processor).

It is known to mount the rear side of a flexible protective element beneath the operator's cab of a chopper, with its front side being attached to the crop gathering device. The sides of the protective element may be arranged on the sides of the chopper's main frame. In the prior art, the one-piece protective element is mounted on the crop gathering device and on the chopper by means of bands. Here, it is disadvantageous that the protective element must be removed before maintenance or repair procedures can be performed on the chopping elements or on the front side of the harvester.

The problem to be solved with the present invention is that of being able to easily service a harvester equipped with a shield for preventing accumulation of crop particles on top surfaces of the harvester drive housings or the like.

SUMMARY OF THE INVENTION

According to the present invention, there is provided an improved shield arrangement for preventing the accumulation of crop particles on a harvesting machine.

An object of the invention is to provide a crop harvester having a shield arrangement for intercepting airborne crop particles before they accumulate on the harvester, the shield arrangement permitting easy servicing of the functional elements of the harvester.

A more specific object of the invention is to provide a crop harvester shield that is provided with an access element that can be opened and closed making it possible to gain access to the functional elements and/or other parts of the harvester located underneath the shield without having to first remove the entire shield.

Yet another object of the invention is to provide a shield, as defined in one or more of the previous objects, wherein the shield is disposed on the harvester such that intercepted crop particles tend to gravitate off the shield so that it is in some respects self-cleaning and where cleaning may be accomplished easily by manually shaking the shield.

Still another object of the invention is to provide a shield, as set forth in the foregoing objects, having an access element in the form of a flap or cover that may be pivoted, or rolled on itself, between open and closed positions.

These and other objects will become apparent from a reading of the ensuing description together with the appended drawings.

BRIEF DESCRIPTION OF THE DRAWINGS

FIG. 4 is a schematic front view of a third embodiment of the flexible shield.

DESCRIPTION OF THE PREFERRED EMBODIMENT

Figure 1:
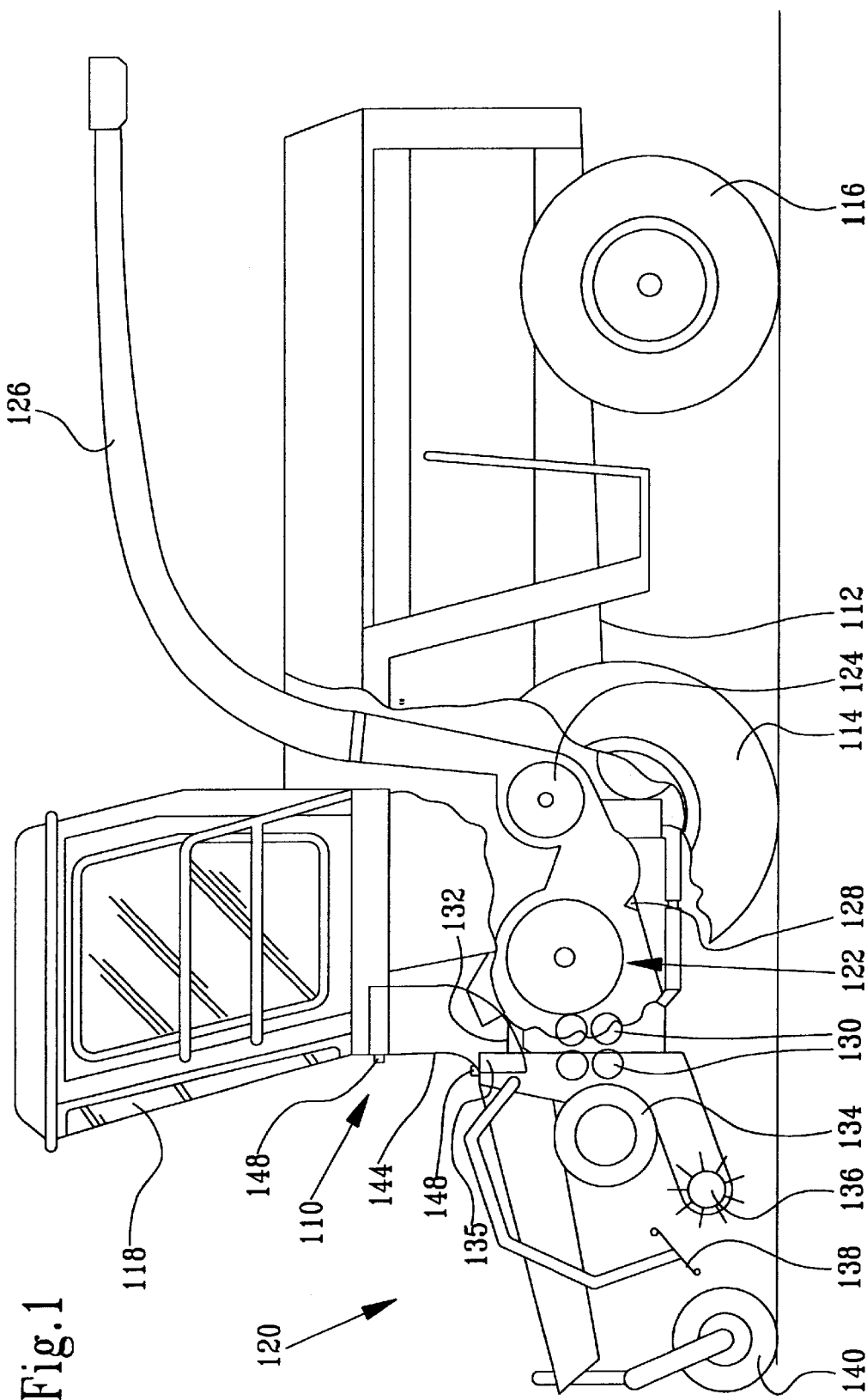
FIG. 1 is a schematic left side view of a self-propelled forage harvester equipped with a flexible protective shield located between the crop gathering device and the infeed elements of the harvester.

Referring now to FIG. 1, there is shown a harvester that is realized in the form of a self-propelled forage harvester 110. The forage harvester 110 is composed of a frame 112 that is carried by front and rear wheels 114 and 116. The forage harvester 110 is operated from an operator's cab 118 from which a crop gathering device 120 is visible. The harvest picked up from the ground by means of the crop gathering device 120, e.g., hay, grass or the like, is transported to a chopping drum 122 by feed rollers 130 arranged within an infeed housing 132. The chopping drum 122 chops the harvest into small pieces and deposits them on a conveyor 124. The harvest is transported from the forage harvester 110 to a trailer which travels alongside said forage harvester, through a discharge chute that is pivotable about an upright axis. A re-crushing device 128 that tangentially feeds the harvest to be transported to the conveyor 124 extends between the chopping drum 122 and the conveyor 124.

The crop gathering device 120 is realized in the form of a so-called pick-up in this embodiment. The crop gathering device 120 is supported on the ground by wheels 140. The crop gathering device 120 is designed for picking up the harvest that is deposited on the field in the form of swaths and to feed the harvest to the forage harvester 110 for additional processing. During this process, the crop gathering device 120 is moved over the field a short distance above the ground during harvesting, with the crop gathering device being raised in order to be transported on a road or the like.

The crop gathering device 120 contains a conveyor 134 in the form of a crew conveyor that transports the picked-up harvest from the sides of the crop gathering device 120 to a not-shown delivery opening situated in the center, with the feed rollers 130 being arranged behind the delivery opening. A pick-up 136 that is driven in rotation, analogously to the conveyor 134, is arranged underneath the conveyor 134 and lifts the harvest off the ground with its conveyor prongs in order to transfer the harvest onto the conveyor 134. A holding-down device 138 in the form of a plate is arranged above the pick-up 136.

A flexible shield or protective element 144 extends between the lower front edge of the operator's cab 118 and the front edge of the upper side of a rear frame element 135 of the crop gathering device 120. This shield 144 is preferably constructed of a flexible material such as cloth, rubber blanket, plastic or an industrial woven fabric, with those of such materials that have a noise-absorbing characteristic being particularly preferred. The shield 144 extends over the entire width of the cab 118 and covers the entire infeed housing 132. Consequently, the shield 144 also covers the functional elements of the forage harvester 110 that are arranged downstream of the infeed housing, e.g., the drives of the harvest conveying and processing elements. It would also be conceivable to make the shield 144 identical in width to that of the forage harvester 110. The shield 144 is more or less tightly stretched independently of the position of the vertically adjustable crop gathering device 120. The shield 144 prevents crop particles whirled up by the crop gathering device 120 from accumulating on the infeed housing 132 and the subsequent subassemblies or functional groups including the respective drives. The crop particles slide down on the shield 144, which is sloped downward and toward the front, and are incorporated into the material flow processed by the forage harvester 110. In addition, the shield 144 absorbs the noises produced by, in particular, the feed rollers 130, the chopping drum 122, the grain processor 124, and if applicable, a so-called power chute or paddle blower arranged between the chopping drum 122 and the blower 124. This means that the operating noise of the forage harvester 110 is reduced. The lateral regions of the flexible shield 144 hang downward and extend toward the rear beside the cab 118 so as to prevent the admission of dust and/or small crop particles from the side. It would also be conceivable to mount the flexible shield 144 on the frame 112 beneath the cab 118 in order to shield all functional subassemblies from crop particles that become airborne due to operation of the crop gathering arrangement 120.

It would also be possible to arrange an upper crossbeam on the front side of the infeed housing 132 in order to attach the front side of a shield thereon. In this case, it is not necessary to remove the shield before the crop gathering device is detached, and to replace the shield once the crop gathering device is reattached. This means that the shield does not necessarily have to extend up to the crop gathering device 120. In this respect, it suffices if the shield covers a significant area of the functional elements on the front side of the harvester 110.

Figure 2:
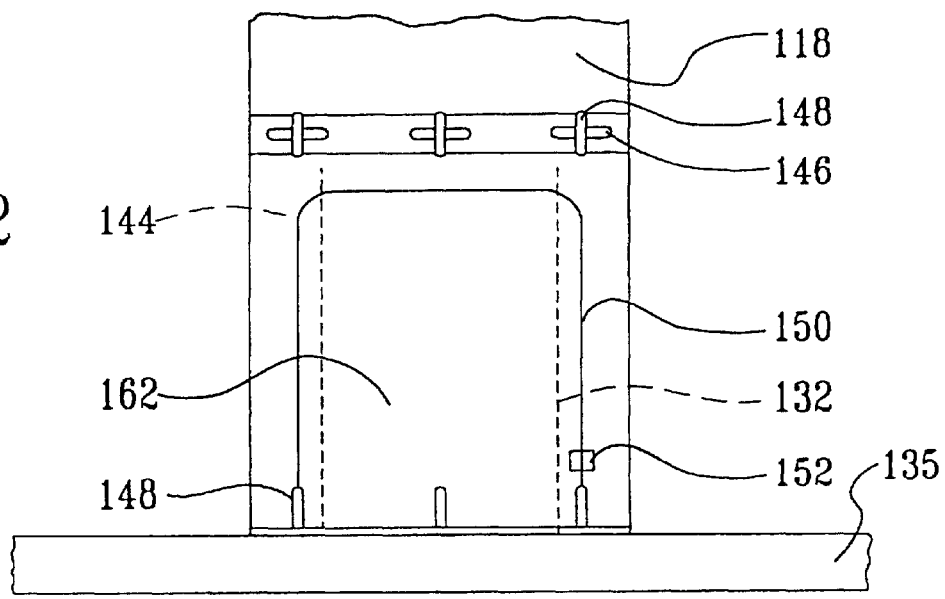
FIG. 2 is a schematic front view of a first embodiment of the flexible shield.

Referring now to FIG. 2, there is shown the flexible shield 144. It covers the entire width of the infeed housing 132, which is illustrated with broken lines, and consequently the functional elements located underneath the infeed housing. At its upper edge, the flexible shield 144 is mounted on the front side of the operator's cab by means of three T-shaped latches 148 that extend through corresponding holes 146 in the shield 144. The T-shaped latches, which are connected to the operator's cab 118, can be turned between the holding position, that is shown in the drawings, wherein they hold the shield 144 in place, and a release position in which they are turned by 90° relative to the holding position and allow the removal of the shield from the cab 118. At its lower edge, the shield 144 is also mounted on the frame element 135 of the crop gathering device 120 in a releasable fashion by means of three rotatable T-shaped latches 148.

In order to rapidly gain access to elements of the forage harvester 110 that are situated within the infeed housing 132, or to the chopping drum 122 or devices assigned thereto, e.g., the sharpening or grinding device or the kernel processor, without having to remove the entire shield 144, the shield is provided with an access element that is realized in the form of a zipper 150 with an opening slide or element 152. The zipper 150 has the shape of a U and extends from a first end near the right lower edge of the flexible shield 144 upward and toward the rear, parallel to its lateral edge, into the vicinity of the cab 118. From near the cab 118, the zipper 150 extends toward the left, as far as the left edge of the shield 144, and then down again toward the lower edge of the shield 144 on the frame element 135. This means that a tongue-shaped section 162 of the shield 144 can be swung downward after the zipper 150 is opened in order to simplify access to the parts of the forage harvester located underneath the shield. It would also be conceivable to utilize several zippers such that several smaller sections of the shield 144 could swing downward. Identical access elements may be provided on the right side and the left side.

Figure 3:
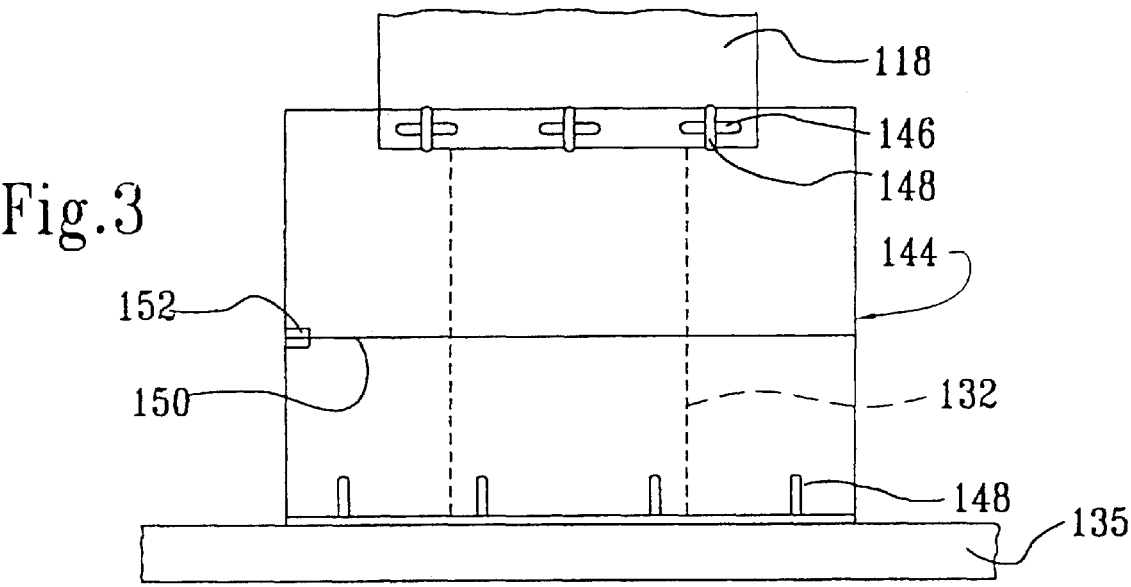
FIG. 3 is a schematic front view of a second embodiment of the flexible shield.

The second embodiment of the invention, which is illustrated in FIG. 3, is essentially realized identically to the embodiment shown in FIG. 2. However, in this case, a zipper 150' extends across a width of a shield 144'. This means that the shield 144' can be divided into two halves of approximately identical size once the zipper 150' is opened in order to gain access to the parts of the forage harvester 110 located underneath the shield 144'. The zipper 150' could also be arranged in the vicinity of the cab 118 such that the majority of the shield 144' could be swung or rolled downward and would not interfere with the maintenance procedures. This shield 144' (which does not include side hanging areas) could be made as wide as the forage harvester 110.

In the third embodiment, which is illustrated in FIG. 4, a flexible shield 144" is utilized that is designed similarly to a window shade. At its lower end, the shield 144" is releasably mounted on the frame element 135 by the rotatable T-shaped latches 148 that are arranged on the frame element 135 and extend through corresponding holes in the flexible protective shield 144". At its opposite end, the shield 144" is attached to a wind-up shaft 154 that is provided with a rotary drive 160. The rotary drive 160 applies a torque to the wind-up shaft 154. Once the flexible shield 144" is released from the frame element 135, the rotary drive 160 causes the shield 144" to be rolled up on the wind-up shaft 154. Thus, it is easily possible to gain access to the parts of the forage harvester 110 that are located underneath the flexible protective shield 144". In addition, the flexible protective shield 144" is always held so tightly stretched that crop particles that engage it slide downward.

It should be noted that it is practical to remove crop particles that might lie on the flexible protective shield 144 or 144' before opening the zipper 150 or 150', or before the shield 144" is wound up, so as to prevent the crop particles from falling onto the drive subassemblies and functional subassemblies located underneath the shield 144, 144' or 144".

Having described the preferred embodiment, it will become apparent that various modifications can be made without departing from the scope of the invention as defined in the accompanying claims.

What is claimed is:

1. In combination with a self-propelled harvester including a main frame supported on front and rear pairs of wheels and having a cab located on the frame in an elevated location between the front pair of wheels, a crop gathering device mounted at the front of said frame for delivering crop material to a crop processing arrangement including functional elements mounted to said frame below said cab, a shield for preventing airborne crop particles thrown up by said crop gathering device from landing on and accumulating on housing surfaces covering said crop processing elements, comprising: said shield extending transversely across a zone extending between said cab and an upper rear location of said crop gathering device; and said shield being provided with at least one access element, movable between open and closed positions, at such a location that, when said access element is in its open position, it is possible to gain access to said functional elements without having to remove said shield.

2. The combination, as defined in claim 1, wherein said shield is constructed of a flexible material.

3. The combination, as defined in claim 2, wherein said access element is in the form of a flap.

4. The combination, as defined in claim 3, wherein said flap is held closed by a zipper.

5. The combination, as defined in claim 3, and wherein a top edge of said shield is supported from said cab by a wind-up device; said shield having a bottom edge extending parallel to said top edge; and a releasable fastener arrangement coupling said lower edge to said crop gathering device.

6. The combination, as defined in claim 1, wherein said shield is generally upright, whereby crop particles will tend to slide off the shield.

7. The combination, as defined in claim 1, wherein upper and lower edges of said shield are respectively releasably attached to said cab and to said crop gathering device by upper and lower sets of quick-release fastener arrangements.

8. The combination, as defined in claim 7, wherein said upper and lower sets of quick-release fastener arrangements each include a plurality of slot-shaped openings in said shield and a plurality of pivotable T-shaped latches fixed to said cab and to said crop gathering device and inserted through a respective slot-shaped opening in said shield.

9. The combination, as defined in claim 1, wherein said shield is made of a sound-absorbing material.

10. The combination, as defined in claim 1, wherein said shield is made of a flexible material; and said access element including a zipper located between upper and lower ends of said shield and extending its entire width, whereby when the zipper is un-zipped, the shield is divided into two parts which may be separated to provide access.

* * * * *